United States Patent
Jung et al.

(10) Patent No.: US 9,607,795 B2
(45) Date of Patent: *Mar. 28, 2017

(54) COMPLEX PROTECTION DEVICE FOR BLOCKING ABNORMAL STATE OF CURRENT AND VOLTAGE

(71) Applicant: SMART ELECTRONICS INC., Ulsan (KR)

(72) Inventors: Jong il Jung, Busan (KR); Doo Won Kang, Anyang-si (KR); Gyu Jin Ahn, Ulsan (KR); Sang Joon Jin, Busan (KR); Hyun Chang Kim, Ulsan (KR); Kyung Mi Lee, Ulsan (KR); Eun Min Kim, Ulsan (KR); Tae Hun Kang, Yangsan-si (KR); Kwang Hoon Lee, Busan (KR); Sang Min Ahn, Miryang-si (KR)

(73) Assignee: SMART ELECTRONICS INC., Ulsan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/647,037

(22) PCT Filed: Nov. 22, 2013

(86) PCT No.: PCT/KR2013/010652
§ 371 (c)(1),
(2) Date: May 22, 2015

(87) PCT Pub. No.: WO2014/081233
PCT Pub. Date: May 30, 2014

(65) Prior Publication Data
US 2015/0303012 A1    Oct. 22, 2015

(30) Foreign Application Priority Data
Nov. 26, 2012  (KR) ........................ 10-2012-0134835

(51) Int. Cl.
*H01H 37/04* (2006.01)
*H01H 85/08* (2006.01)
(Continued)

(52) U.S. Cl.
CPC ........ *H01H 37/043* (2013.01); *H01H 85/046* (2013.01); *H02H 3/087* (2013.01);
(Continued)

(58) Field of Classification Search
CPC .......... H02H 7/18; H02H 9/042; H02H 3/087; H02H 9/041; H02H 5/041; H01H 85/046;
(Continued)

(56) References Cited

U.S. PATENT DOCUMENTS 2,741,687 A * 4/1956 Toppari .................. H01C 1/032
338/257
5,914,649 A * 6/1999 Isono ................. H01H 85/0411
337/290
(Continued)

FOREIGN PATENT DOCUMENTS

CN        1299310 A       2/2007
CN        1909220 A       2/2007
(Continued)

*Primary Examiner* — Anatoly Vortman
(74) *Attorney, Agent, or Firm* — Novick, Kim & Lee, PLLC; Jae Youn Kim

(57) ABSTRACT

A complex protection device for blocking an abnormal state of current and voltage is disclosed. In the complex protection device, a resistive element is configured in the form of a structure and thus the resistive element has enhanced durability and surface mounting technology suitable for automation may be utilized, and a plurality of resistive elements is configured in various resistances and sizes to be optimally designed for product characteristics.

11 Claims, 15 Drawing Sheets

(51) Int. Cl.
  *H01H 85/046* (2006.01)
  *H02H 9/04* (2006.01)
  *H02H 3/087* (2006.01)
  *H02H 7/18* (2006.01)
  *H01H 85/46* (2006.01)
  *H01H 61/02* (2006.01)
  *H02H 5/04* (2006.01)
  *H01H 37/76* (2006.01)

(52) U.S. Cl.
  CPC .............. *H02H 7/18* (2013.01); *H02H 9/041* (2013.01); *H02H 9/042* (2013.01); *H01H 37/761* (2013.01); *H01H 61/02* (2013.01); *H01H 85/463* (2013.01); *H02H 5/041* (2013.01)

(58) Field of Classification Search
  CPC .... H01H 37/043; H01H 85/463; H01H 61/02; H01H 37/761
  USPC .......................................................... 337/414
  See application file for complete search history.

(56) References Cited

U.S. PATENT DOCUMENTS

| | | | | |
|---|---|---|---|---|
| 5,936,508 | A * | 8/1999 | Parker ................... | G09F 3/0294 337/241 |
| 5,939,969 | A * | 8/1999 | Doerrwaechter .... | H01H 37/761 337/152 |
| 6,373,371 | B1 * | 4/2002 | Doerrwaechter .... | H01H 37/761 29/623 |
| 6,445,276 | B2 * | 9/2002 | Schon ..................... | H01H 85/46 180/279 |
| 6,452,475 | B1 * | 9/2002 | Kawazu ............... | H01H 85/463 29/623 |
| 6,566,995 | B2 * | 5/2003 | Furuuchi ............. | H01L 23/5256 257/E23.149 |
| 7,286,037 | B2 * | 10/2007 | Furuuchi ............. | H01H 85/046 337/159 |
| 8,289,122 | B2 * | 10/2012 | Matthiesen .......... | H01H 37/761 337/167 |

FOREIGN PATENT DOCUMENTS

| | | |
|---|---|---|
| CN | 101689439 A | 3/2010 |
| JP | 3-283602 A | 12/1991 |
| JP | 08-161990 A | 6/1996 |
| JP | 2000-306477 A | 11/2000 |
| JP | 2007-0491421 A | 2/2007 |
| JP | 2007-12312 A | 5/2007 |
| JP | 2007-123129 A | 5/2007 |
| JP | 2008-311161 A | 12/2008 |
| JP | 2009-037935 A | 2/2009 |
| KR | 10-2001-0006916 A | 1/2001 |
| KR | 100560058 B1 | 3/2006 |
| KR | 10-2010-0027171 A | 3/2010 |
| KR | 10-2011-0117179 A | 10/2011 |

* cited by examiner (WHEN OVERVOLTAGE IS APPLIED)

1

COMPLEX PROTECTION DEVICE FOR BLOCKING ABNORMAL STATE OF CURRENT AND VOLTAGE

BACKGROUND OF THE INVENTION

Field of the Invention

The present invention relates to a complex protection device for blocking an abnormal state of current and voltage, and more particularly to a complex protection device for blocking an abnormal state of current and voltage in which a resistive element is configured in the form of a structure and thus the resistive element has enhanced durability and surface mounting technology suitable for automation can be utilized, and a plurality of resistive elements is configured in various resistances and sizes to be optimally designed for product characteristics.

Description of the Related Art

A non-return protection device, which operates by sensing overheating of equipment to be protected caused by overcurrent or in response to an abnormal increase in the ambient temperature, blocks an electric circuit through operation at a predetermined operating temperature for the safety purposes of the equipment. As an example, there is a protection device which heats a resistor by current of a signal for detecting an abnormality in equipment and operates a fuse unit by the generated heat. In a lithium ion secondary battery including a protection device, which includes a resistor generating heat in an abnormal state on a ceramic substrate and uses membrane resistance, the protection device prevents performance degradation or ignition due to dendrites formed on a surface of an electrode in an overcharge mode or prevents the battery from being charged to more than a predetermined voltage in a charge mode.

Korean Patent Application Publication No. 10-2001-0006916 discloses a protective element including: a low melting point metal body electrode and a heating element on a substrate; a low melting point metal body directly formed on the low melting point metal body electrode and the heating element; an inner sealing part formed on the low melting point metal body and formed of a solid flux to prevent surface oxidation of the low melting point metal body; and an outer sealing part or a cap that is formed outside of the inner sealing part and prevents a molten material from leaking to the outside of the protective element when the low melting point metal body is blown.

FIGS. 12A and 12B are a plan view and a sectional view of a conventional protection device including a fusible element (a low melting point metal body) on a resistor (a heating element). FIG. 13 is a photograph showing a state in which a fusible element is blown when overvoltage is applied to the conventional protection device.

Referring to FIGS. 12A and 12B, the conventional protection device includes a ceramic substrate 1, a paste-type resistor 2 formed on the ceramic substrate 1, and an insulator 3, a fuse terminal 4, a fusible element 5, and a case 6 that are sequentially stacked on the resistor 2. The fuse terminal 4 includes a connection portion 4a connected to a resistance terminal 8.

When current is supplied to the resistor 2, heat generated from the resistor 2 is dissipated via the resistance terminal 8 connected to the fuse terminal 4. That is, the heat generated from the resistor 2 is not uniformly supplied to the fusible element 5 such that a relatively low heat is supplied to a region thereof close to the connection portion 4a.

Accordingly, as illustrated in FIG. 13, when the fusible element 5 is blown, a blown surface is non-uniform at opposite sides thereof, and thus an insulation distance of the region close to the connection portion 4a is very small, which results in low insulation stability.

In addition, the resistor 2 of the conventional protection device is formed by coating of a resistor paste formed of an inorganic-based binder or an organic-based binder and thus has reduced durability and does not exhibit sufficient time-lag characteristics to enable use at a high voltage.

SUMMARY OF THE INVENTION

Therefore, the present invention has been made in view of the above problems, and it is an object of the present invention to provide a complex protection device for blocking an abnormal state of current and voltage in which a resistive element is configured in the form of a structure and thus the resistive element has enhanced durability and surface mounting technology suitable for automation may be utilized.

It is another object of the present invention to provide a complex protection device for blocking an abnormal state of current and voltage in which a plurality of resistive elements may be configured in various resistances and sizes such that the resistive elements are connected to each other in parallel at opposite sides of a fusible element and thus the complex protection device may have an increased degree of freedom and be optimally designed for product characteristics.

It is a further object of the present invention to provide a complex protection device for blocking an abnormal state of current and voltage in which a plurality of resistive elements is connected to each other in parallel at opposite sides of a fusible element and thus an insulation distance may be sufficiently secured when the fusible element is blown.

It is a further object of the present invention to provide a complex protection device for blocking an abnormal state of current and voltage in which a resistive element is spaced apart from a fusible element so as to prevent a resistor from being blown at a reference voltage.

In accordance with the present invention, the above and other objects can be accomplished by the provision of a complex protection device for blocking an abnormal state of current and voltage, the complex protection device including a fusible element connected to first and second terminals formed on a main circuit and blown when overcurrent is supplied to the main circuit; a plurality of resistive elements connected in parallel to a resistance terminal connected to the fusible element; and a switching device controlling such that current flows to the resistance terminal when a voltage above the reference voltage is applied to the main circuit, wherein the first and second terminals and the resistance terminal are disposed in parallel on the same plane to be spaced apart from each other and the fusible element is blown by heat generated by the resistive elements when a voltage above the reference voltage is applied, and wherein the resistive elements comprise first and second resistive elements connected to each other in parallel at opposite sides of the fusible element.

The first and second resistive elements may have the same resistance.

The first and second resistive elements may have different resistances.

The first and second resistive elements may have the same size or different sizes and thus a degree of freedom is increased when the protection circuit is designed.

First and second connection terminals connected to the first and second resistive elements are provided between the first and second terminals, an insulating layer and a conductive layer are sequentially stacked on the first and second connection terminals, and the first and second resistive elements and the fusible element are disposed in parallel on the conductive layer, and the fusible element is blown out by radiant heat dissipated from the first and second resistive elements and conduction heat transferred through the conductive layer.

The conductive layer may have a first end connected to third terminal and a second end insulated from fourth terminal, and when the switching device is turned on, current in the main circuit flows via the fusible element, the conductive layer, and the third terminal, and is divided and flows via the first and second resistive elements, and is merged and flows into fourth terminal.

The resistive elements may include a resistive body formed of a ceramic material, terminal parts formed at opposite ends of the resistive body, and a resistive layer formed around an outer circumferential surface of the resistive body.

The switching device may include a transistor and a control unit controlling current to flow to the resistive element by applying a control signal for turning on the transistor when a voltage that is higher than the reference voltage is applied.

The resistive elements may include an insulation cover partially formed on an outer surface thereof, the insulation cover being not formed only on a surface of the resistive element facing the fusible element and thus heat generated by the resistive element is concentrated at the fusible element.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described with reference to the accompanying drawings.

When it is determined that a detailed description of the related art may unnecessarily obscure the subject matter of the present invention, the description thereof will be omitted. Further, the following terms, which are defined in consideration of functions of the present invention, may be altered depending on the user's intentions or judicial precedents. Therefore, the meaning of each term should be interpreted based on the entire disclosure of the specification.

Figure 1:
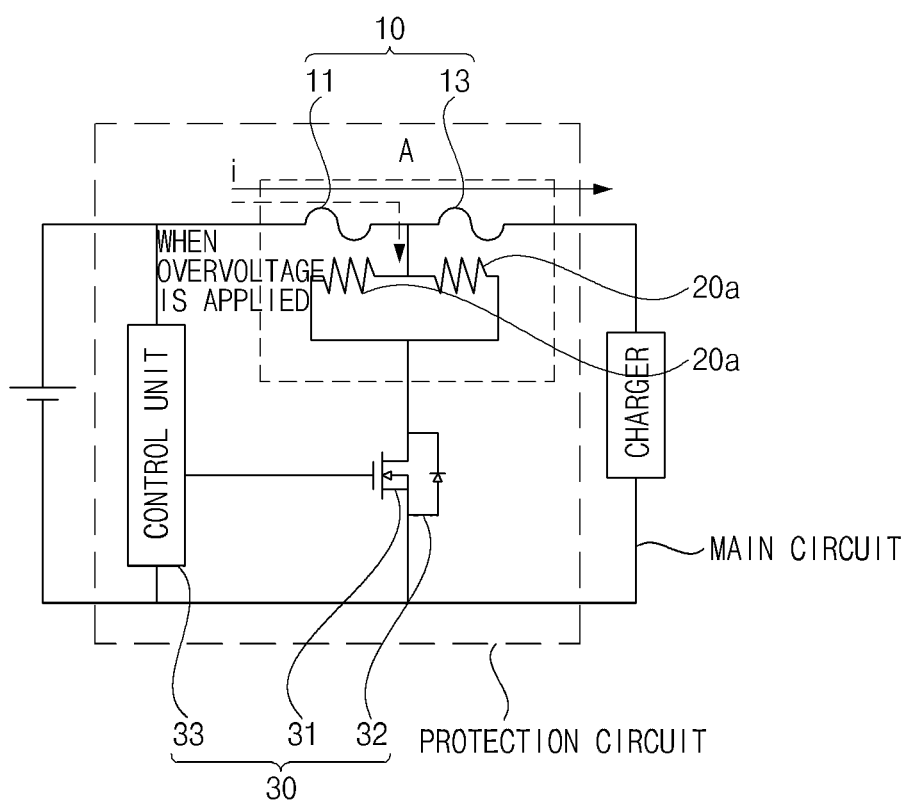
FIG. 1 is a circuit diagram for explaining an operation state of a complex protection device for blocking an abnormal state of current and voltage, according to a first embodiment of the present invention.

FIG. 1 is a circuit diagram for explaining an operation state of a complex protection device for blocking an abnormal state of current and voltage, according to a first embodiment of the present invention.

Referring to FIG. 1, the complex protection device for blocking an abnormal state of current and voltage (hereinafter, referred to as "complex protection device") protects a device connected to a main circuit in an abnormal state by fusing a fusible element 10 connected on the main circuit.

The types of the main circuit suitable for use in the complex protection device are not particularly limited, and may be, for example, a circuit for charging a portable secondary battery. Thus, an application example of the complex protection device to a circuit for charging a secondary battery will now be described in the following description.

The complex protection device may include the fusible element 10, a power supply, and a charger that are connected to each other on the main circuit.

A protection circuit is connected in parallel between terminals of the power supply and the charger and detects a case in which a voltage above a reference voltage is applied so as to protect the charger. In particular, the complex protection device may include a plurality of resistive elements 20 connected in parallel to the fusible element 10 and a switching device 30 connected to the resistive elements 20, on the protection circuit.

The switching device 30 may include a diode 32, a transistor 31, and a control unit 33 controlling current to flow to the resistive elements 20 by applying a control signal for turning on the transistor 31 when a voltage that is lower or higher than the reference voltage is applied, but embodiments of the present invention are not limited thereto.

Figure 2:
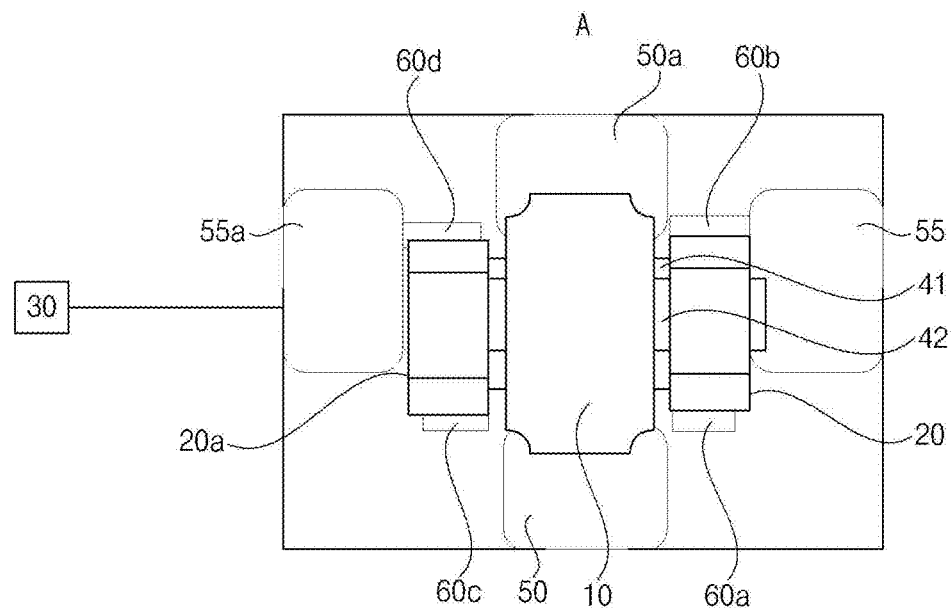
FIG. 2 is a plan view of the complex protection device according to the first embodiment of the present invention.
Figure 3A:
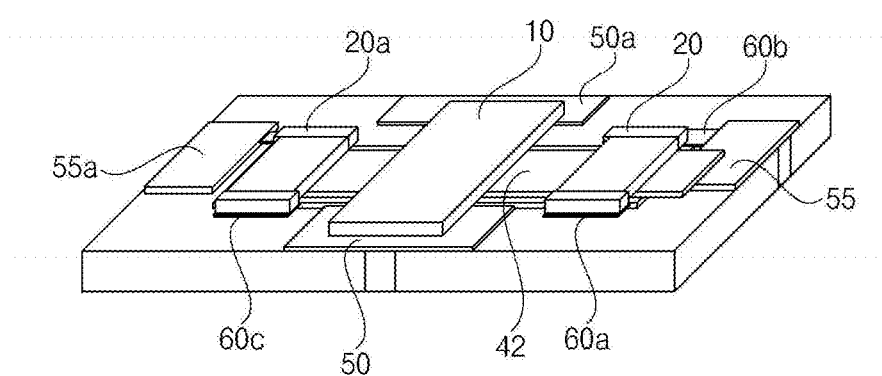
FIGS. 3A and 3B are a perspective view and an exploded perspective view of the complex protection device according to the first embodiment of the present invention.
Figure 3B:
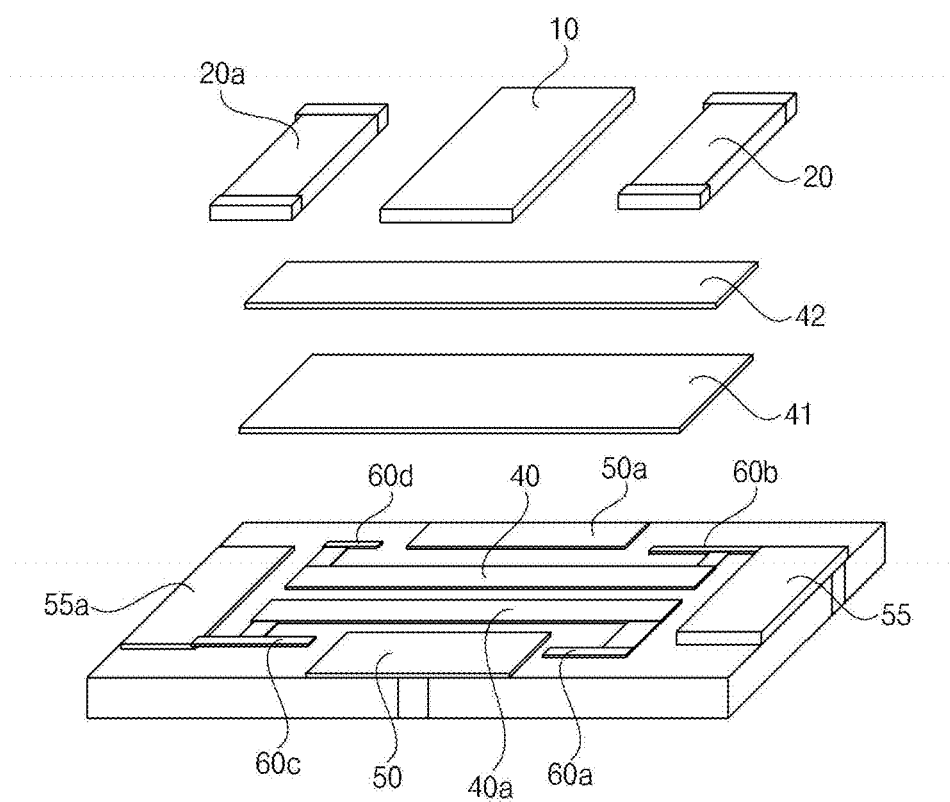

FIG. 2 is a plan view of the complex protection device according to the first embodiment of the present invention. FIGS. 3A and 3B are a perspective view and an exploded perspective view of the complex protection device according to the first embodiment of the present invention.

Referring to FIGS. 2 through 3B, the complex protection device largely includes the fusible element 10, the resistive elements 20 (i.e., first and second resistive elements 20 and 20a), and the switching device 30.

The fusible element 10 is connected to first and second terminals 50 and 50a that are formed on the main circuit and is blown out when overcurrent is supplied to the main circuit, to protect the charger.

The fusible element 10 may be made of a low melting point metal or alloy which has a melting point of 120 to 220° C.

First and second connection terminals 40 and 40a each connected to the first and second resistive elements 20 and 20a are disposed between the first and second terminals 50 and 50a. Opposite ends of the first connection terminal 40 are electrically connected to resistance terminals 60b and 60d, respectively, and opposite ends of the second connection terminal 40a are electrically connected to resistance terminals 60a and 60c, respectively.

An insulating layer 41 and a conductive layer 42 are sequentially stacked on the connection terminal 40, and the first and second resistive elements 20 and 20a and the fusible element 10 are disposed in parallel on the conductive layer 42.

The insulating layer 41 electrically insulates the first and second connection terminals 40 and 40a connection terminal 40 from the conductive layer 42.

The conductive layer 42 not only allows the fusible element 10 and the first and second resistive elements 20 and 20a to be electrically connected to each other, but also transfers heat generated from the first and second resistive elements 20 and 20a to the fusible element 10. The conductive layer 42 may be formed by coating a silver (Ag) paste, or the like on the insulating layer 41.

The conductive layer 42 has a first end connected to a third terminal 55 and a second end insulated from a fourth terminal 55a. As such, the first and second resistive elements 20 and 20a are connected to each other in parallel.

The first and second terminals 50 and 50a are disposed in parallel on the same plane to be spaced apart from each other, and the resistance terminals 60a and 60c and the resistance terminals 60b and 60d are disposed in parallel on the same plane to be spaced apart from each other. As such, the first and second resistive elements 20 and 20a formed on the conductive layer 42 may be disposed in parallel at opposite sides of the fusible element 10 to be spaced apart from each other.

Meanwhile, when overvoltage is applied to the main circuit and, consequently, the switching device 30 is turned on, current flowing in the main circuit flows to the fusible element 10, the conductive layer 42, and the third terminal 55, is divided to the first and second resistive elements 20 and 20a via the resistance terminal 60b and the first connection terminal 40, is merged into the resistance terminal 60c via the second connection terminal 40a, and flows to the fourth terminal 55a.

Figure 4:
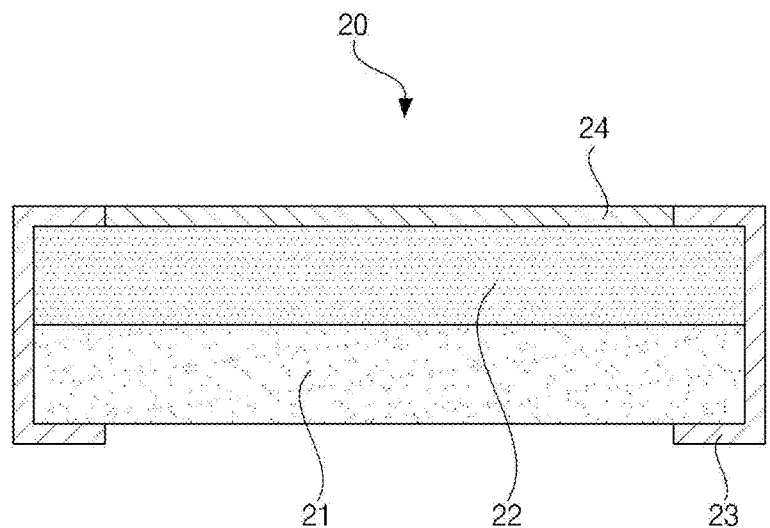
FIG. 4 is a sectional view of a resistive element according to the present invention.

FIG. 4 is a sectional view of the resistive element 20 according to the present invention. As illustrated in FIG. 4, the resistive element 20 may include a resistive body 21 made of a ceramic material, terminal parts 23 formed at opposite ends of the resistive body 21, a resistive layer 22 formed on the resistive body 21, and a coating layer 24 to protect the resistive layer 22. However, embodiments of the present invention are not limited to the above example. That is, examples of a resistive element include a resistive element including a resistive body provided with a coil wound around an outer circumferential surface thereof, a resistive element provided with spiral grooves, a MELF type resistive element, a chip type resistive element, and the like.

As described above, the resistive element 20 of the complex protection device may be configured in the form of a structure and thus may have enhanced durability, as compared to a conventional resistive element coated in a paste form on a fusible element. Thus, fusing or breakdown of the resistive element 20 prior to the fusible element 10 may be prevented, and thus the charger may be stably protected.

In addition, the resistive element 20 may be configured in the form of a structure independently from the fusible element 10, and thus is advantageous in that surface mounting technology may be utilized.

Figure 5A:
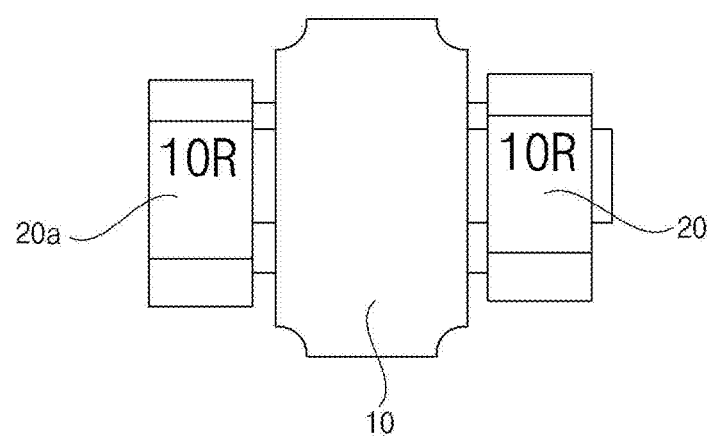
FIGS. 5A through 5C are plan views illustrating arrangement of the resistive element according to the present invention.
Figure 5B:
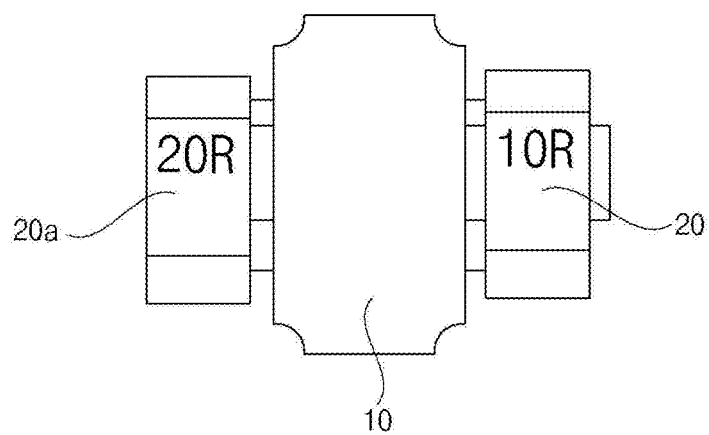
Figure 5C:
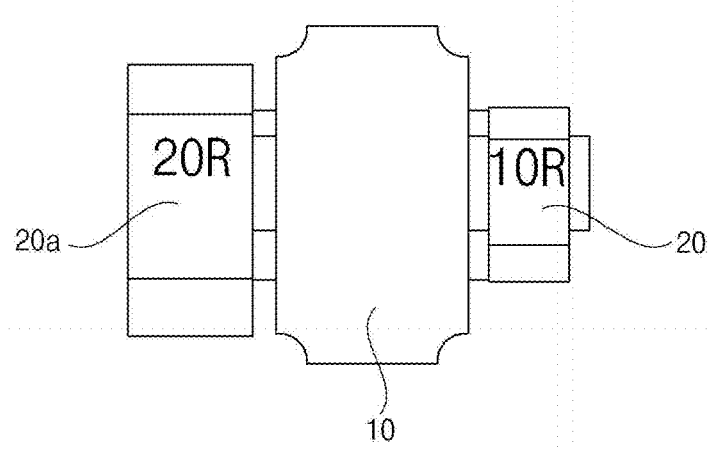

FIGS. 5A through 5C are plan views illustrating arrangement of the resistive elements 20 according to the present invention.

Referring to FIG. 5A, the resistive elements 20 consist of the first and second resistive elements 20 and 20a connected to each other in parallel at opposite sides of the fusible element 10. In this regard, the first and second resistive elements 20 and 20a may have the same resistance 10R, and, as illustrated in FIGS. 5B and 5C, the first and second resistive elements 20 and 20a may have different resistances (i.e., 20R and 10R).

As illustrated in FIGS. 5B and 5C, when the first and second resistive elements 20 and 20a have different resistances, the first and second resistive elements 20 and 20a may be configured such that the second resistive element 20a has a higher resistance than the first resistive element 20 and has a size corresponding to that of the first resistive element 20 (see FIG. 5B) or a larger size than that of the first resistive element 20 (see FIG. 5C).

In the complex protection device according to the present invention, as described above, the plurality of resistive elements may be configured in various resistances and sizes/shapes. When the main circuit or the protection circuit is designed through various combinations of the resistive elements, a degree of freedom of the complex protection device may be increased and a complex protection device optimized for product characteristics may be manufactured.

In addition, the resistive elements of the complex protection device according to the present invention are configured in parallel. Accordingly, when a resistive element disposed at one side, e.g., the second resistive element 20a of FIG. 5A, does not properly operate, the first resistive element 20 operates normally. That is, the first and second resistive elements 20 and 20a complement each other, and thus stability may be increased.

Figure 6A:
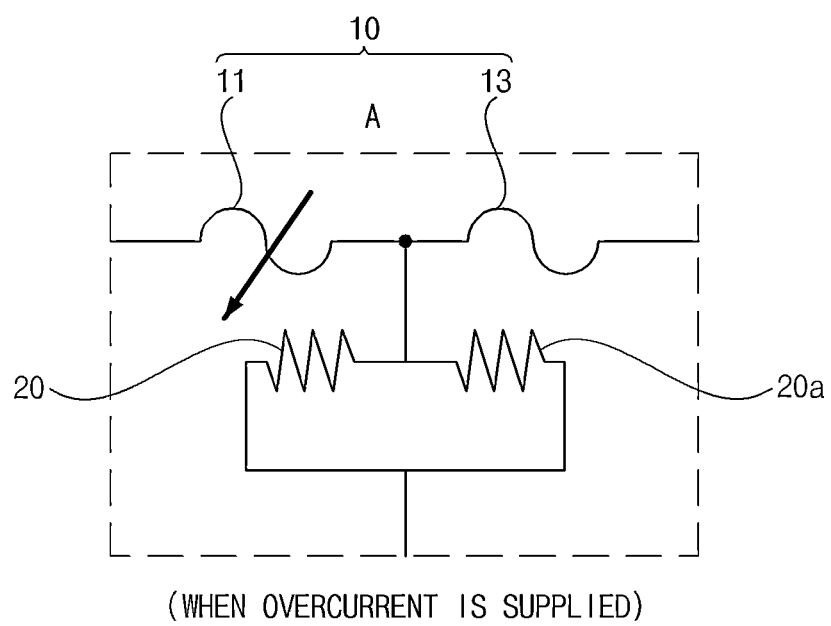
FIGS. 6A and 6B are a circuit diagram and a plan view illustrating a state in which a fusible element is blown when overcurrent is supplied to a main circuit.
Figure 6B:
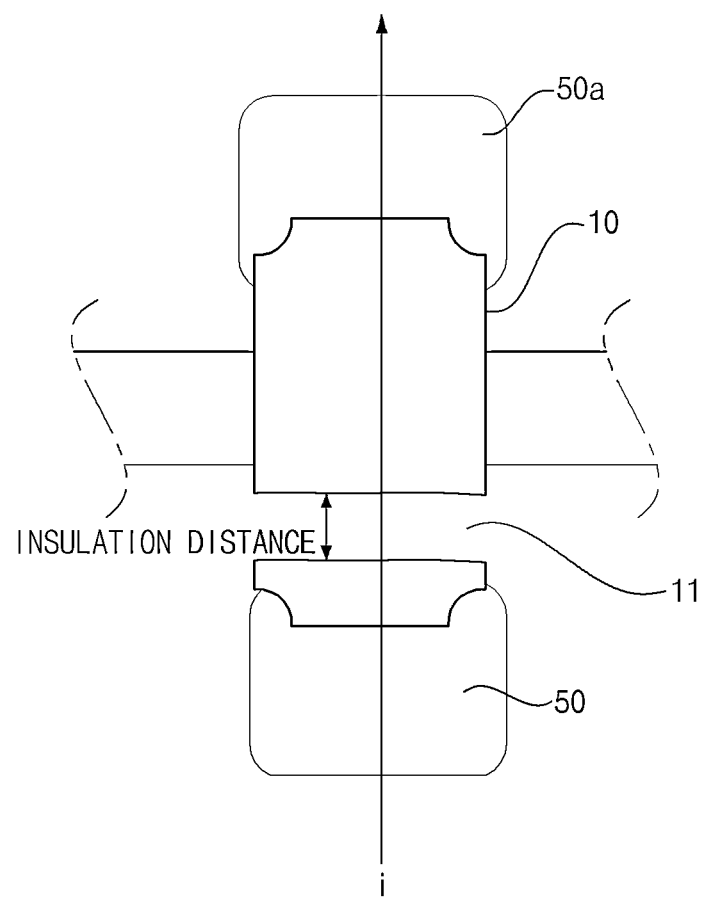
Figure 6C:
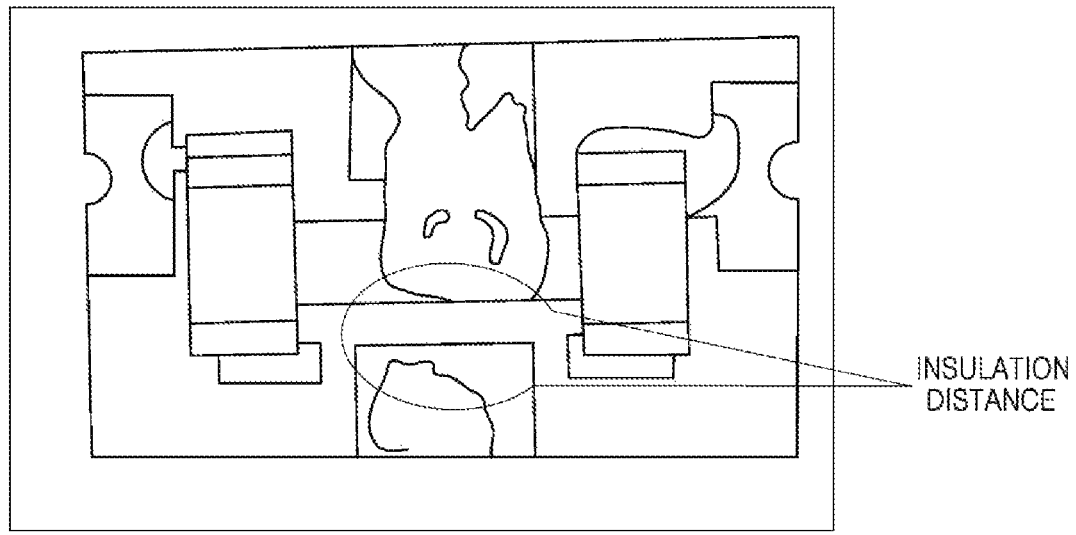
FIG. 6C is a photograph showing a state in which the fusible element is blown when overcurrent is applied.

FIGS. 6A and 6B are a circuit diagram and a plan view illustrating a state in which a fusible element is blown when overcurrent is supplied to a main circuit. FIG. 6C is a photograph showing a state in which the fusible element is blown when overcurrent is applied.

Referring to FIGS. 6A through 6C, the fusible element 10 is blown out by heat generated when a surge current instantaneously introduced to the main circuit is supplied thereto.

In this regard, the fusible element 10 is blown out in a front end region 11 thereof and the main circuit is short-circuited and thus damage to or explosion of the charger is prevented. The fusible element 10 is blown out by heat generated when surge current instantaneously introduced into the main circuit is applied thereto.

Figure 7A:
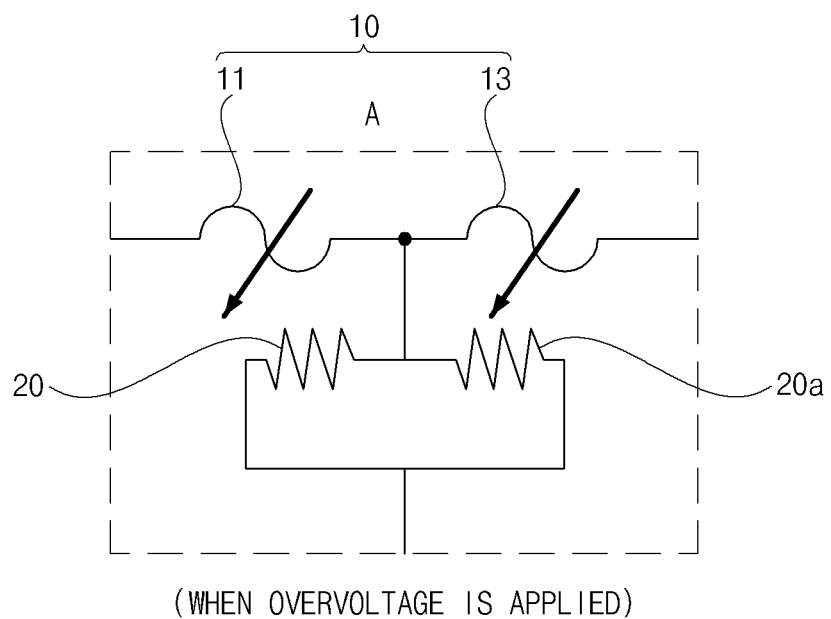
FIGS. 7A and 7B are a circuit diagram and a plan view illustrating a state in which the fusible element according to the present invention is blown.
Figure 7B:
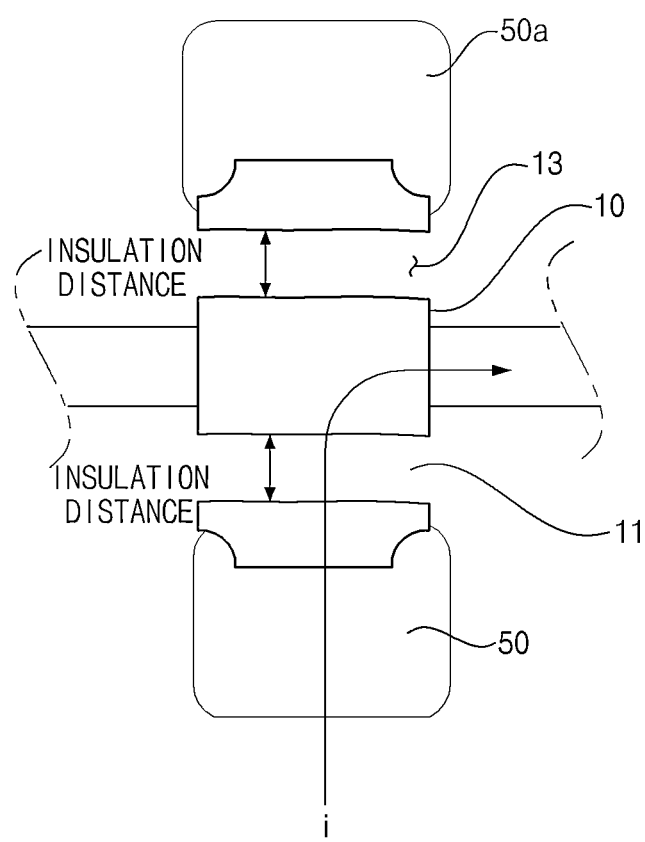
Figure 7C:
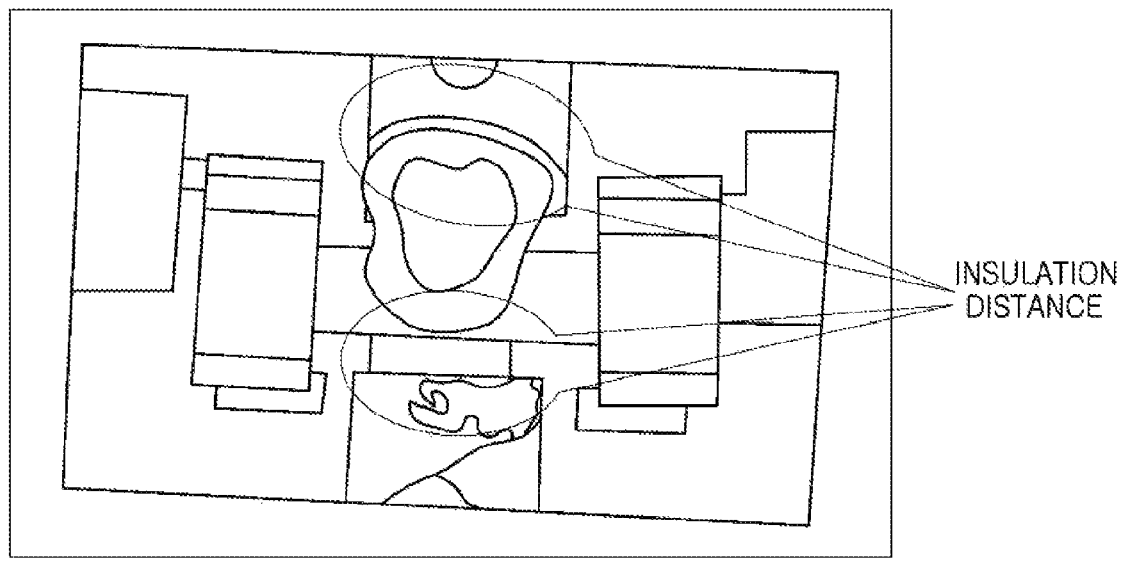
FIG. 7C is a photograph showing a state in which the fusible element is blown when overvoltage is applied.

FIGS. 7A and 7B are a circuit diagram and a plan view illustrating a state in which the fusible element according to the present invention is blown out. FIG. 7C is a photograph showing a state in which the fusible element is blown out when overvoltage is applied.

Referring to FIGS. 7A through 7C, as described above, when a voltage above the reference voltage, e.g., overvoltage is applied to the main circuit, the switching device controls current to flow to the first and second resistive elements 20 and 20a (see FIG. 1). In this regard, the fusible element 10 is blown out in the front end region 11 and a rear end region 13 thereof by heat generated when current is introduced into the first and second resistive elements 20 and 20a, thereby protecting the charger.

As described above, the complex protection device may protect the charger in an abnormal state, i.e., when overcurrent is supplied or when overvoltage is applied.

Figure 13:
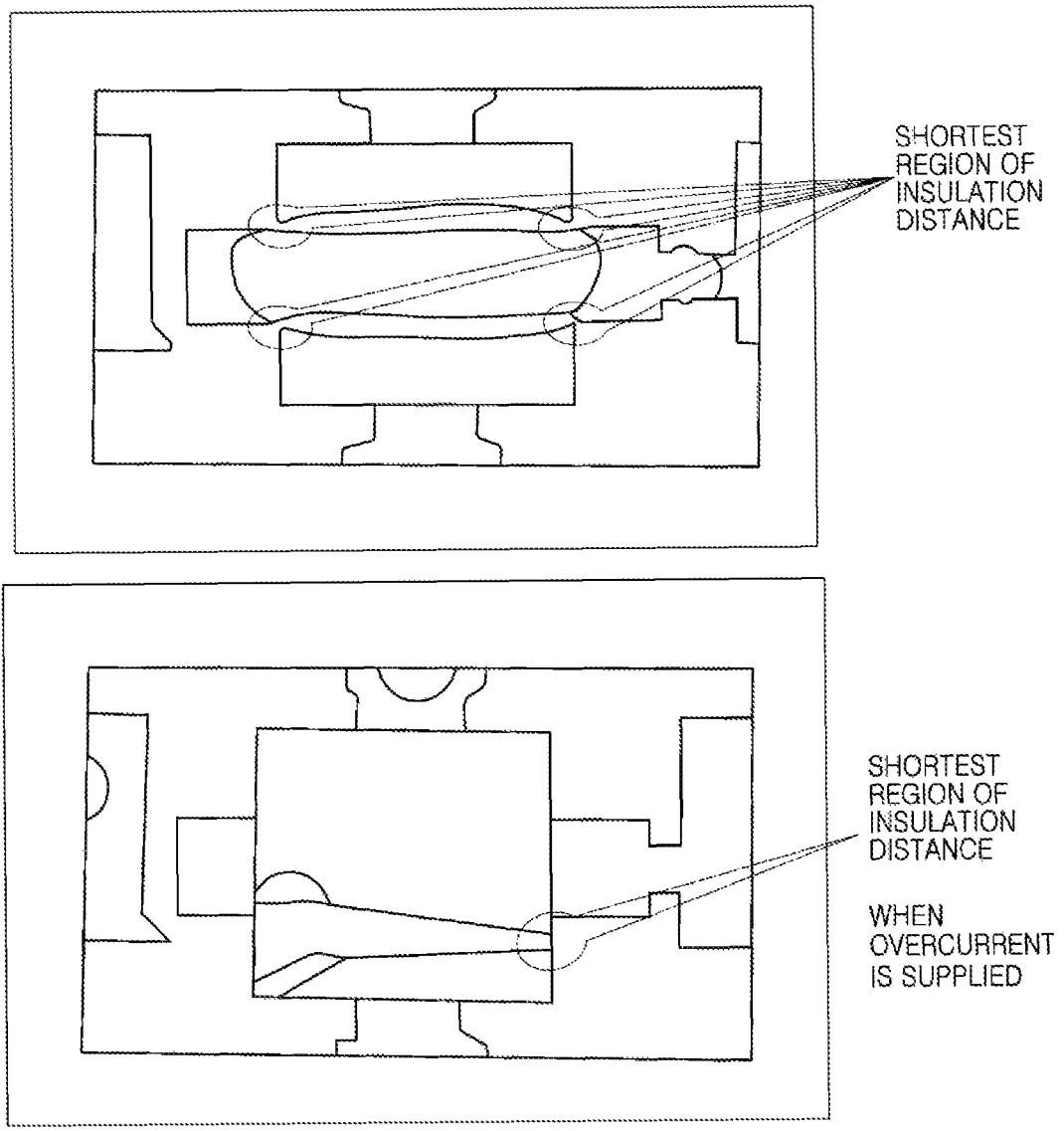
FIG. 13 is a photograph showing a state in which a fusible element is blown when overvoltage is applied to the conventional protection device.

In particular, as can be confirmed with reference to FIGS. 6C and 7C, the complex protection device may secure a sufficient fusing distance of the fusible element 10 as compared to a conventional protection device (see FIG. 13).

Figure 8:
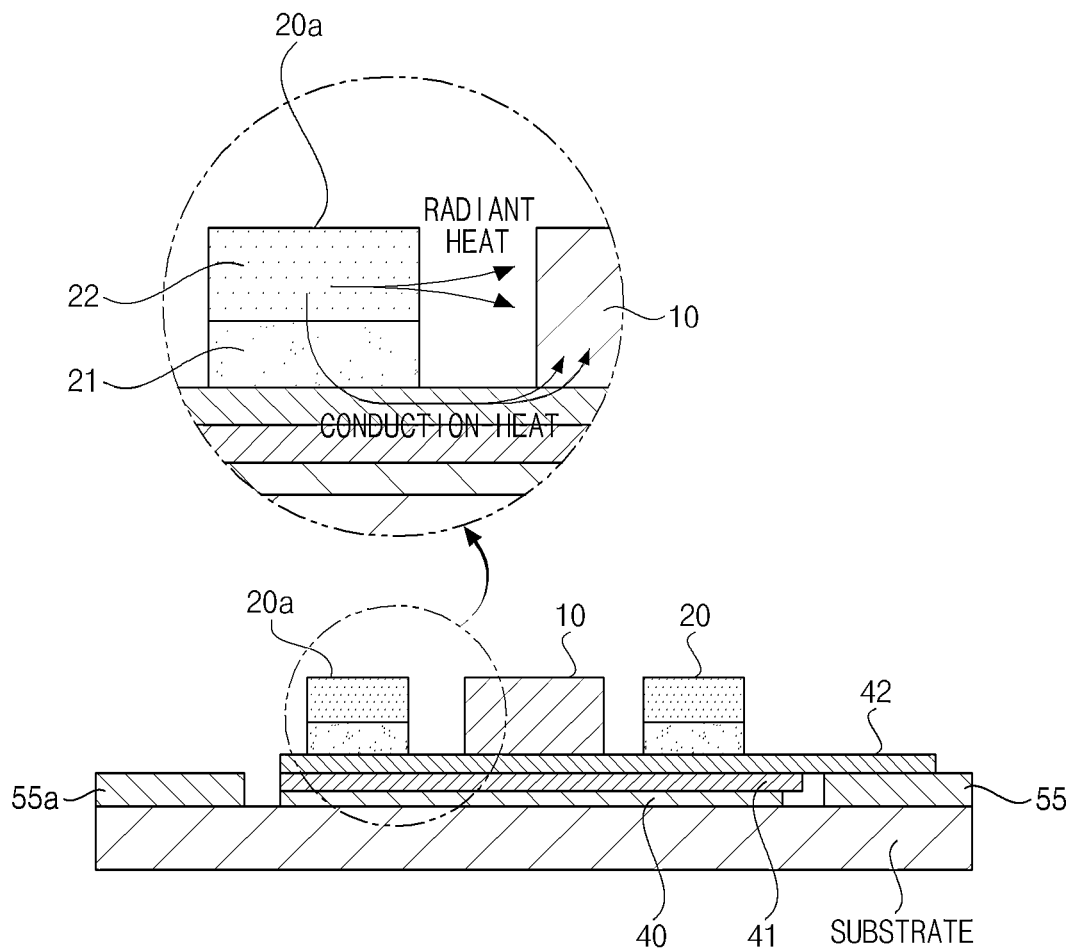
FIG. 8 is a sectional view of the complex protection device according to the first embodiment of the present invention.

FIG. 8 is a sectional view of the complex protection device according to the first embodiment of the present invention.

Referring to FIG. 8, the complex protection device includes the first and second resistive elements 20 and 20a disposed in parallel at opposite sides of the fusible element 10. Thus, when a voltage above the reference voltage is applied to the main circuit, the fusible element 10 is blown out by radiant heat dissipated from the first and second resistive elements 20 and 20a and conduction heat transferred through the conductive layer 42.

Since the first and second resistive elements 20 and 20a are disposed at opposite sides of the fusible element 10, an insulation distance may be sufficiently secured when the fusible element 10 is blown out (see FIG. 6C).

In the complex protection device, the first and second resistive elements 20 and 20a are spaced apart from the fusible element 10 by a predetermined interval. Thus, even though current is temporarily supplied to the first and second resistive elements 20 and 20a in a state in which a voltage below the reference voltage is applied to the main circuit, a predetermined fusing delay time may be secured due to the interval between the first and second resistive elements 20 and 20a and the fusible element 10.

Figure 9:
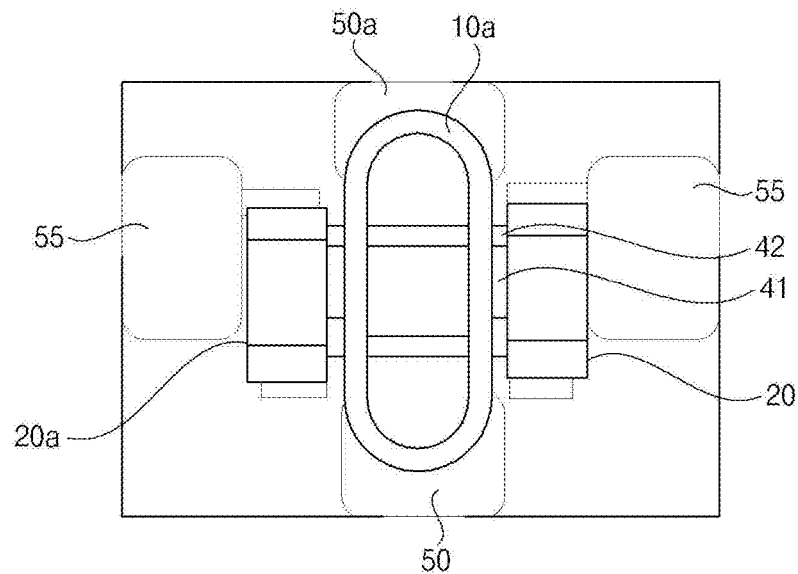
FIG. 9 is a plan view of a complex protection device for blocking an abnormal state of current and voltage, according to a second embodiment of the present invention.
Figure 10:
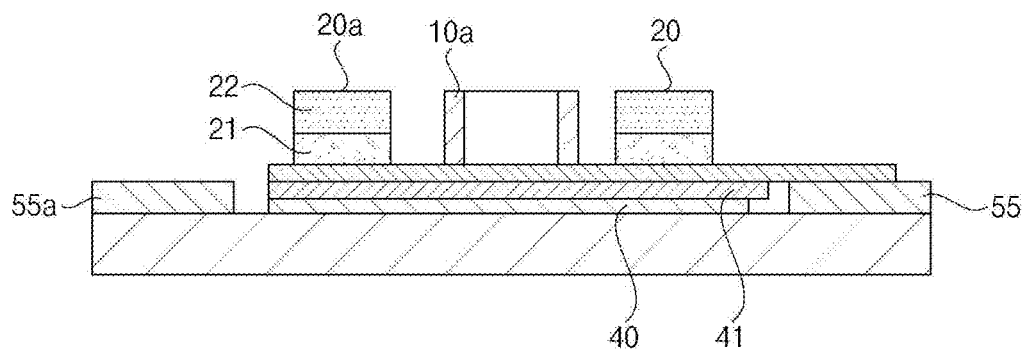
FIG. 10 is a sectional view of the complex protection device according to the second embodiment of the present invention.

FIG. 9 is a plan view of a complex protection device for blocking an abnormal state of current and voltage, according to a second embodiment of the present invention. FIG. 10 is a sectional view of the complex protection device according to the second embodiment of the present invention.

Referring to FIGS. 9 and 10, a fusible element 10a may take the form of a ring having a hollow central region, unlike the fusible element 10 of a flat panel type as illustrated in FIG. 2.

By the configuration in which the fusible element 10a has a ring shape, fusing time may be freely controlled.

In addition, a blown-out portion of the fusible element 10a has a smaller width than that of the fusible element 10 of a flat panel type, and thus an insulation distance is increased when the fusible element 10a is blown out, whereby a risk of explosion of the charger may be significantly reduced.

Figure 11:
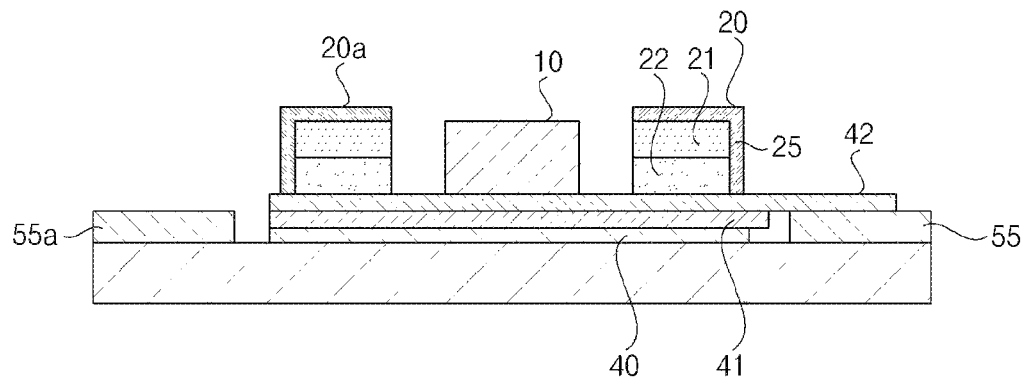
FIG. 11 is a plan view of a complex protection device for blocking an abnormal state of current and voltage, according to a third embodiment of the present invention.
Figure 12A:
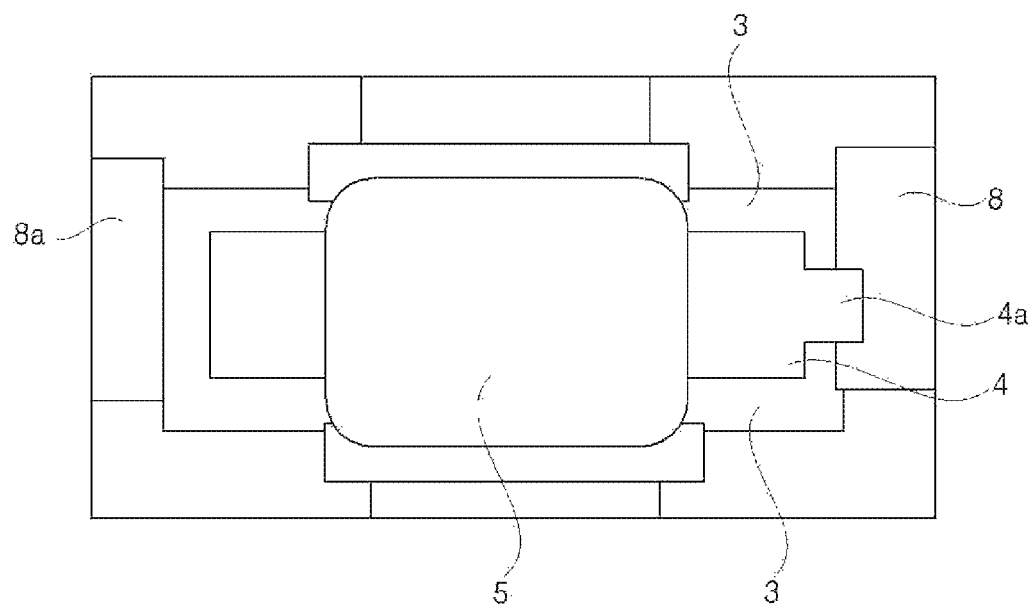
FIGS. 12A and 12B are a plan view and a sectional view of a conventional protection device including a fusible element (a low melting point metal body) on a resistor (a heating element)
Figure 12B:
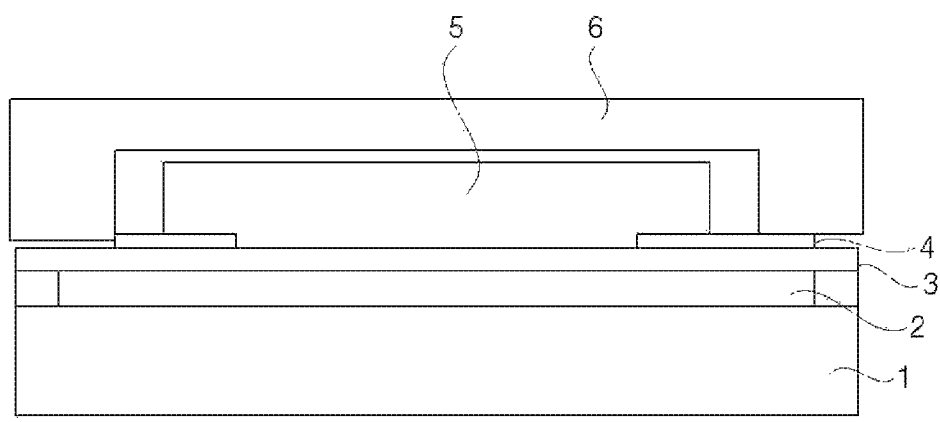

FIG. 11 is a sectional view of a complex protection device for blocking an abnormal state of current and voltage, according to a third embodiment of the present invention.

Referring to FIG. 11, the complex protection device may include an insulation cover 25 disposed on an outer surface portion of each of the first and second resistive elements 20 and 20a.

The insulation cover 25 provides directivity such that heat generated from the first and second resistive elements 20 and 20a is concentrated at a fusible element 10.

That is, the insulation cover 25 is formed on the outer surface portion of each resistive element except an outer surface portion of each resistive element facing the fusible element 10.

As described above, by forming the insulation cover 25 on the outer surface portion of each resistive element, fusing time may be shortened and heat transfer to adjacent devices may be prevented.

As is apparent from the above description, according to a complex protection device for blocking an abnormal state of current and voltage, according to the present invention, a resistive element is configured in the form of a structure, and thus the resistive element has enhanced durability and surface mounting technology suitable for automation may be used.

In addition, in the complex protection device according to the present invention, a plurality of resistive elements may be configured in various resistances and sizes such that the resistive elements are connected to each other in parallel at opposite sides of a fusible element and thus the complex protection device may have an increased degree of freedom and be optimally designed for product characteristics.

Moreover, in the complex protection device according to the present invention, a plurality of resistive elements is connected in parallel at opposite sides of a fusible element and thus an insulation distance may be sufficiently secured when the fusible element is blown.

Furthermore, in the complex protection device according to the present invention, a resistive element is spaced apart from a fusible element so as to prevent a resistor from being blown at a reference voltage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A complex protection device for blocking an abnormal state of current and voltage, the complex protection device comprising:

a fusible element connected to a first and a second terminals disposed on a main circuit and configured to be blown when overcurrent is supplied to the main circuit;

a plurality of resistive elements connected in parallel to a resistance terminal connected to the fusible element; and a switching device controlling such that current flows to the resistance terminal when a voltage higher than a reference voltage is applied to the main circuit, wherein the first and second terminals and the resistance terminal are disposed in parallel on a same plane to be spaced apart from each other and the fusible element is configured to be blown by heat generated by the plurality of resistive elements when the voltage higher than the reference voltage is applied, and wherein the plurality of resistive elements comprise a first and a second resistive elements connected to each other in parallel at opposite sides of the fusible element, and wherein the complex protection device further comprises:

a first and a second connection terminals connected to the first and second resistive elements and disposed between the first and second terminals; and an insulating layer and a conductive layer sequentially stacked on the first and second connection terminals, and the first and second resistive elements and the fusible element are disposed in parallel on the conductive layer.

2. The complex protection device according to claim 1, wherein the first and second resistive elements have the same resistance.

3. The complex protection device according to claim 1, wherein the first and second resistive elements have different resistances.

4. The complex protection device according to claim 2, wherein the first and second resistive elements have the same size or different sizes and thus a degree of freedom is increased when the protection circuit is designed.

5. The complex protection device according to claim 2, wherein:
the heat generated by the plurality of resistive elements includes radiant heat dissipated from the first and second resistive elements and conduction heat transferred through the conductive layer.

6. The complex protection device according to claim 5, wherein the conductive layer has a first end connected to a third terminal and a second end insulated from a fourth terminal, and
when the switching device is turned on, current in the main circuit flows via the fusible element, the conductive layer, and the third terminal, and is divided and flows via the first and second resistive elements, and is merged and flows into the fourth terminal.

7. The complex protection device according to claim 1, wherein each of the resistive elements comprises a resistive body formed of a ceramic material, a first and a second terminal parts disposed at opposite ends of the resistive body respectively, and a resistive layer disposed around an outer circumferential surface of the resistive body.

8. The complex protection device according to claim 1, wherein the switching device comprises a transistor and a control unit controlling current to flow to the plurality of resistive elements by applying a control signal for turning on the transistor when the voltage that is higher than the reference voltage is applied.

9. The complex protection device according to claim 3, wherein the first and second resistive elements have the same size or different sizes and thus a degree of freedom is increased when the protection circuit is designed.

10. The complex protection device according to claim 3, wherein:
the heat generated by the plurality of resistive elements includes radiant heat dissipated from the first and second resistive elements and conduction heat transferred through the conductive layer.

11. A complex protection device for blocking an abnormal state of current and voltage, the complex protection device comprising:
a fusible element connected to a first and a second terminals disposed on a main circuit and configured to be blown when overcurrent is supplied to the main circuit;
a plurality of resistive elements connected in parallel to a resistance terminal connected to the fusible element; and
a switching device controlling such that current flows to the resistance terminal when a voltage higher than a reference voltage is applied to the main circuit,
wherein the first and second terminals and the resistance terminal are disposed in parallel on a same plane to be spaced apart from each other and the fusible element is configured to be blown by heat generated by the plurality of resistive elements when the voltage higher than the reference voltage is applied,
wherein the plurality of resistive elements comprise a first and a second resistive elements connected to each other in parallel at opposite sides of the fusible element, and
wherein each of the resistive elements comprises a first outer surface portion, a second outer surface portion facing the fusible element, and an insulation cover disposed on the first outer surface portion and thus the heat generated by the plurality of resistive elements is concentrated at the fusible element.

* * * * *